United States Patent [19]

Baldwin et al.

[11] Patent Number: 5,018,705
[45] Date of Patent: May 28, 1991

[54] BREAK AWAY TORCH HOLDER FOR CUTTING MACHINES

[75] Inventors: John B. Baldwin, Warrenville; David R. Draper, Montgomery, both of Ill.

[73] Assignee: Caterpillar Inc., Peoria, Ill.

[21] Appl. No.: 529,407

[22] Filed: May 29, 1990

[51] Int. Cl.$^5$ ............................................... B23K 7/10
[52] U.S. Cl. ......................................... 266/77; 266/67
[58] Field of Search .............................. 266/48, 77, 67

[56] References Cited

U.S. PATENT DOCUMENTS

| | | | |
|---|---|---|---|
| 4,171,124 | 10/1979 | Coulter et al. | 266/77 |
| 4,466,069 | 8/1984 | Balfanz | 364/475 |
| 4,533,078 | 8/1985 | Klein | 228/45 |
| 4,899,993 | 2/1990 | Habermann et al. | 266/77 |

Primary Examiner—S. Kastler
Attorney, Agent, or Firm—Sterling Richard Booth, Jr.; Robert E. Muir

[57] ABSTRACT

Automatic cutting machines carry flame cutting torches in close proximity of a work piece and can force the torch into contact with an upturned cut away piece from the work piece, causing considerable damage to the cutting apparatus. The subject apparatus provides a break away torch holder having a housing surrounding a torch tube which is mounted in an adaptor. The adaptor has a pilot that matches a pilot seat in the housing. The pilot is held in the pilot seat by resilient means that allows the torch tube to move with respect to the housing when the torch strikes an upturned cut away piece. A switch means is provided to shut the cutting machine down when the torch tube means is in the housing. Sealing means is also provided to protect the piloting apparatus and switch means from the debris of the cutting action.

12 Claims, 5 Drawing Sheets

BREAK AWAY TORCH HOLDER FOR CUTTING MACHINES

DESCRIPTION

1. Technical Field

This invention relates to a break away torch holder for cutting machines to prevent torch damage should it make accidental contact with a work piece.

2. Background Art

The large cutting machines used in today's factories have a rail on each side of a work piece supporting table. Mounted on these rails is a transverse track on which are mounted carriages that carry plasma arc torches. The work piece supporting table has bar-like members that extend across the table that have openings between for the dispersal of the metal that is being cut away by the torches and a generally open area for the flame that breaks through the work piece. Beneath these cross pieces there is a water tank that collects the cut away metal and keeps the work cool.

The carriages and the transverse track are motor driven which are controlled by a tape control or a computer control. These controls cause the torches to traverse the work piece which is a large plate of steel, usually one-half to one inch thick to cut out prescribed shapes for different fabrications to be used in the fabrication of different components for a machine.

Since the cutting machines are computer controlled, they are frequently left unattended as they are cutting a piece of steel as the operators maintain several machines since they do not require his direct operation. Frequently, small pieces of steel that are cut away fall partially through the supporting bars causing one end to tip up. When this happens, one of the torches may strike that piece causing the machine to break down. Frequently the damage can be severe since it either destroys the torch, breaks the carriage or sometimes may even bend the transverse track.

Different methods have been attempted to overcome this problem, one of which was a tapered cone used to support the torch as shown in U.S. Pat. No. 4,899,993 issued to Habermann et al. However, it was found that the cone could not be reset properly without the use of dial indicators to make sure the torch was set exactly on the center of the carriage. This type of a reset took considerable time and required the services of a millwright or the like to reset the machine.

Another attempt was to cut a notch circumferentially around the torch tube which is the part that supports the torch in the carriage. The idea was that the notch in the tube would fail before any of the other parts of the system would fail. However, this also required an extensive repair time since the tube and torch had to be replaced at each incidence.

It is a primary object of this invention to provide a break away torch holder that can be readily reset by the operator without the need of a millwright or the like to totally reset the machine or replace the broken parts.

It is a further object of this invention to provide a shut-off means in cooperation with the break away device to cause the machine to stop in the break away position so that the remaining cut can be continued without considerable readjustment by the operator.

It is still a further object of this invention to provide a sealing means wherein the lower extremities of the torch holding device are sealed from the smoke and debris from the cutting action.

DISCLOSURE OF THE INVENTION

In one aspect of the invention, a break away torch holder is provided for a cutting machine having a transverse track on which one or more torch carrying carriages are mounted. The carriages are mounted to be transversely moveable on the transverse track by a first power means. The transverse track is mounted on rails above a work piece supporting table and a second power means is utilized to move the transverse track along the rails above the work piece. A controller is utilized to cause the first and second power means to cause a torch to follow a prescribed pattern over the work piece. The break away torch holder is comprised of a housing attached to the carriage by a support, and the housing has an internal pilot seat adjacent to a first opening at a first end of the housing. A collet inside the housing is used to clamp the tube to an adaptor for supporting the torch, and the tube extends through the first opening and a second opening of the housing. The adaptor secured to the collet has a pilot on one end that sits in the pilot seat. Resilient means extends between a wall of the housing and an end of the adaptor for holding the pilot of the adaptor against the pilot seat.

The pilot seat in the housing and the pilot on the adaptor have matching flat surfaces which are perpendicular to the centerline of the torch and a matching tapered surface extending at an angle from the flat surface whereby the torch is centered and properly located within the holder.

A sealing means consisting of a bellows extends between the torch supporting tube and the housing to seal the first opening of the housing in the vicinity of the torch to prevent the fumes and debris from the cutting action from getting inside the housing and interfering with the pilot seat.

A pair of switches extends through the wall of the housing making contact with a ramp on the adaptor whereby as the adaptor is moved against the resilient means when the torch strikes an object the switches will be activated, causing the machine to shut down. The switches are located 135° apart to allow the switches to operate no matter which direction the torch may strike an object causing it to break away.

BEST MODE FOR CARRYING OUT THE INVENTION

Figure 1:
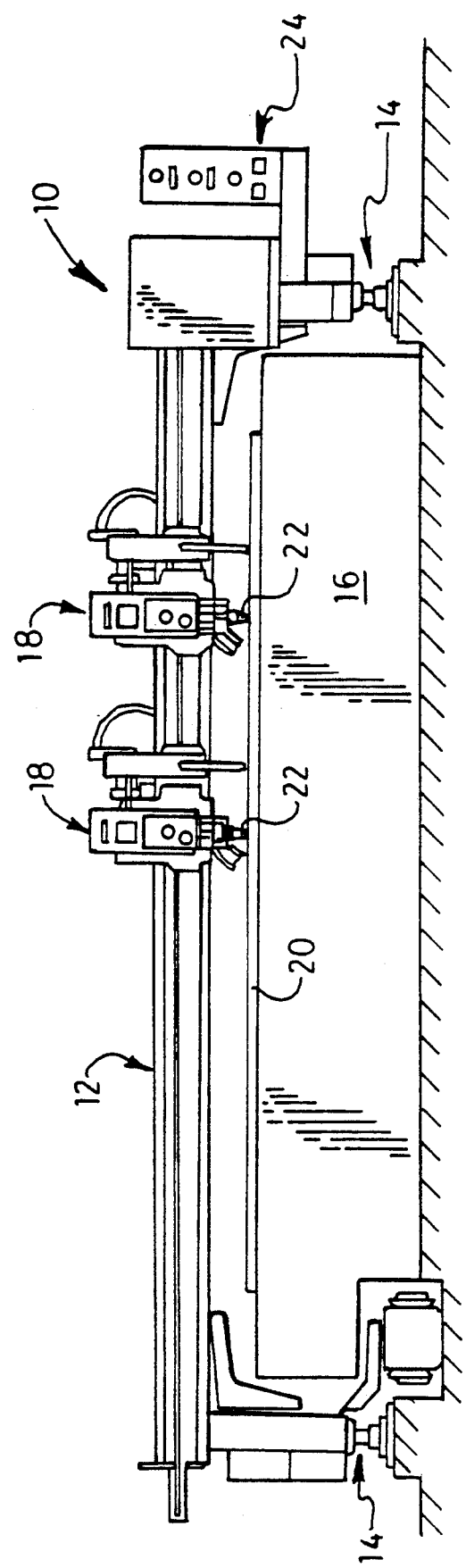
FIG. 1 is an overall view of the cutting machine showing the association of its various components.

FIG. 1, a flame cutting machine, illustrated by the numeral 10, includes a transverse track 12 supported by guide rails 14 located on both ends of the transverse track 12. A work piece support table 16 is located beneath the transverse track 12 and between the guide rails 14.

Carriages 18 are movably supported on the transverse track 12. A work piece 20 is supported by the work piece support table 16 and is located in close proximity to torches 22 mounted on the carriages 18.

At one side of the cutting machine is shown a controller 24 which controls the operation of the transverse track as it is moved on the guide rails 14 and the carriages 18 as they move on the transverse track 12.

Figure 2:
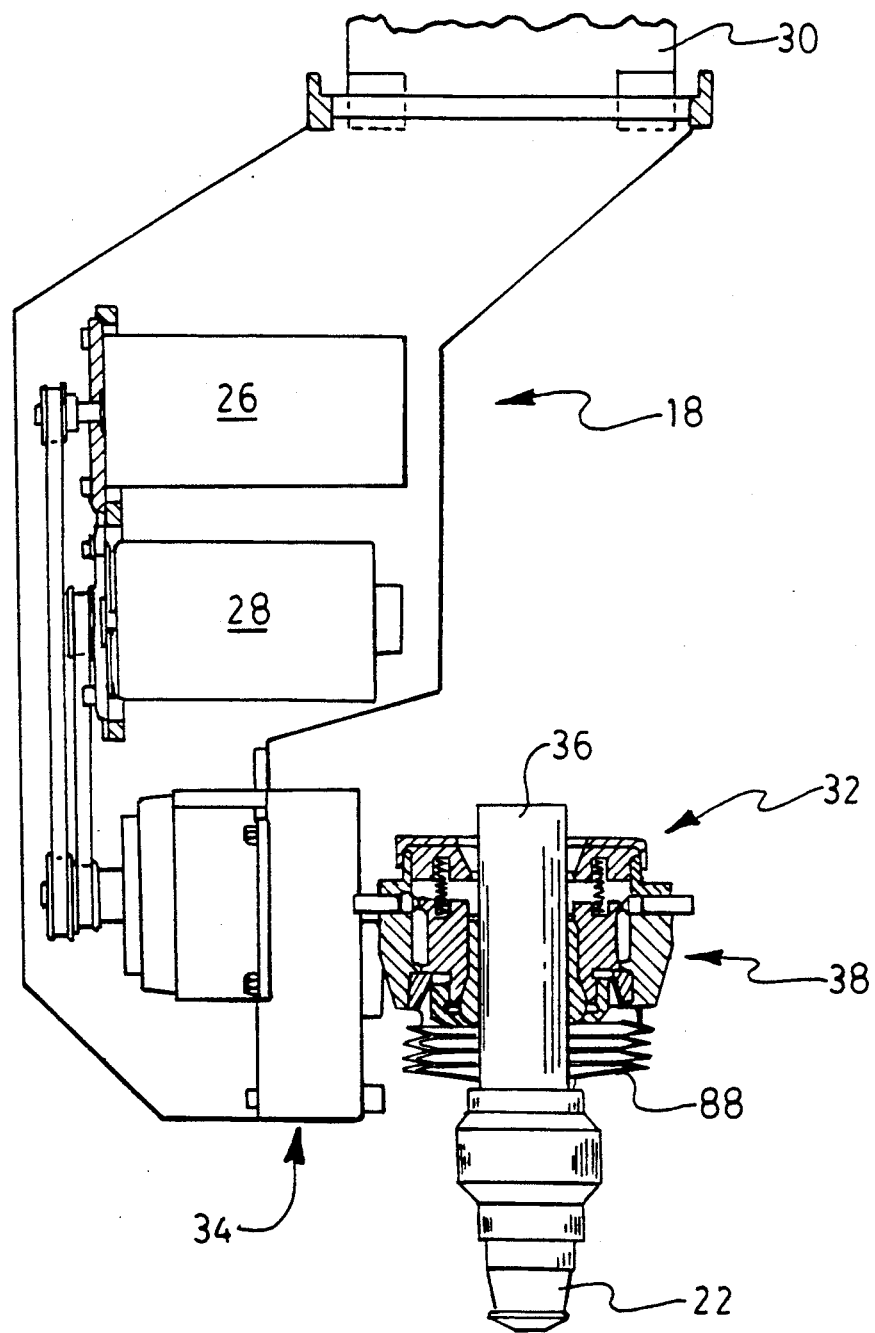
FIG. 2 is an enlarged view of one of the carriages and the torch holding means.

In FIG. 2, an enlarged side view of the carriage 18 is shown. Motors 26 and 28 controlled by the controller 24 controls the angle of the torch as it is moved across the work piece or steel plate to cut out the prescribed shapes. A motor 30 at the top of the carriage 18 is supported on the transverse rail 12. This motor causes the carriage 18 to rotate as it moves in respect to the transverse rail 12. causing the torch 22 to be at the angle desired by the controller 24.

The torch 22 is supported by the break away holder 32 that is attached to the carriage by a support 34.

Figure 3:
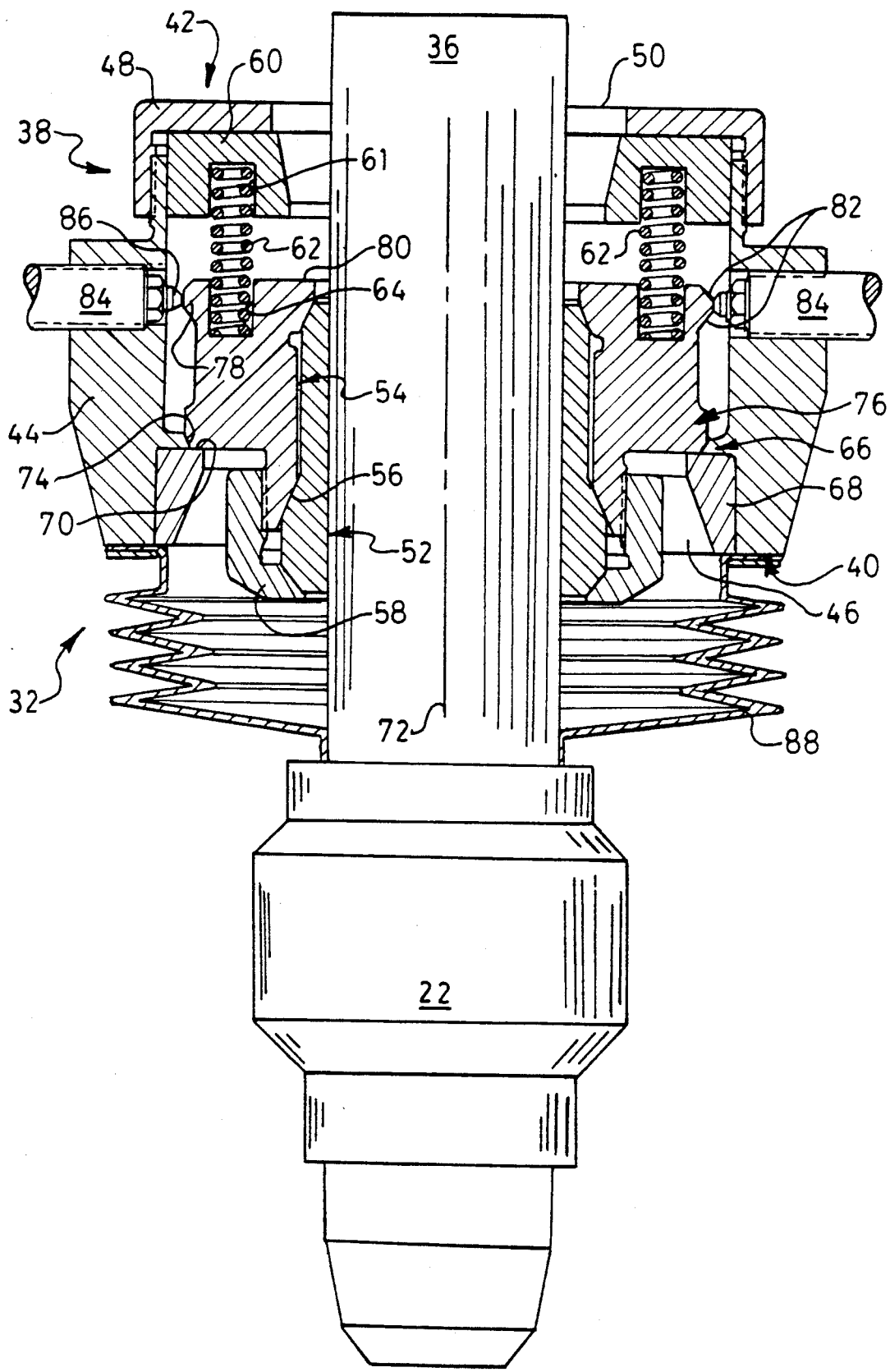
FIG. 3 is a further enlarged cross sectional view of the break away holder and torch.

An enlarged view of the torch 22 and break away holder 32 is shown in FIG. 3 with the components of the holder shown in cross section. The torch 22 of the plasma arc type is attached to a torch tube 36. The torch tube 36 extends through a housing 38 with the torch 22 being below a first end 40 and the tube extending outwardly from the opposite end 42 of the housing 38.

The housing consists of a circumferential wall 44 having a first opening 46. At the opposite end 42 of the housing 38, a cover or cap 48 is threaded to the circumferential wall. The cover 48 has a second opening 50 through which tube 36 extends.

The gas and electrical conduits extend downwardly through the torch tube 36 to the torch 22. These have not been shown since they are a conventional arrangement.

Internal of the housing 38, a collet 52 surrounds and clamps to the tube 36. An adaptor 54 having a taper 56 compresses the collet 52 against the tube 36 clamping the tube to the adaptor. A nut 58 is threaded onto the adaptor 54 to cause the collet to be forced into the adaptor.

A spring support 60 is located within the opposite end 42 of the housing 38. The spring support means has pockets 61 for resilient means or springs 62.

The springs 62 are compression coil springs which extend into pockets 64 of the adaptor 54.

A pilot seat 66 is provided by an adaptor 68 near the first opening 46 of the housing 38. The pilot seat 66 consists of a flat surface 70 which is perpendicular to a center line 72 of the torch tube 36 and an angular or tapered surface 74 extending upwardly and away from the flat surface 70.

The adaptor 54 has a pilot 76 that fits into the pilot seat 66. The pilot 76 has surfaces that match the surfaces of the pilot seat 66.

Figure 4:
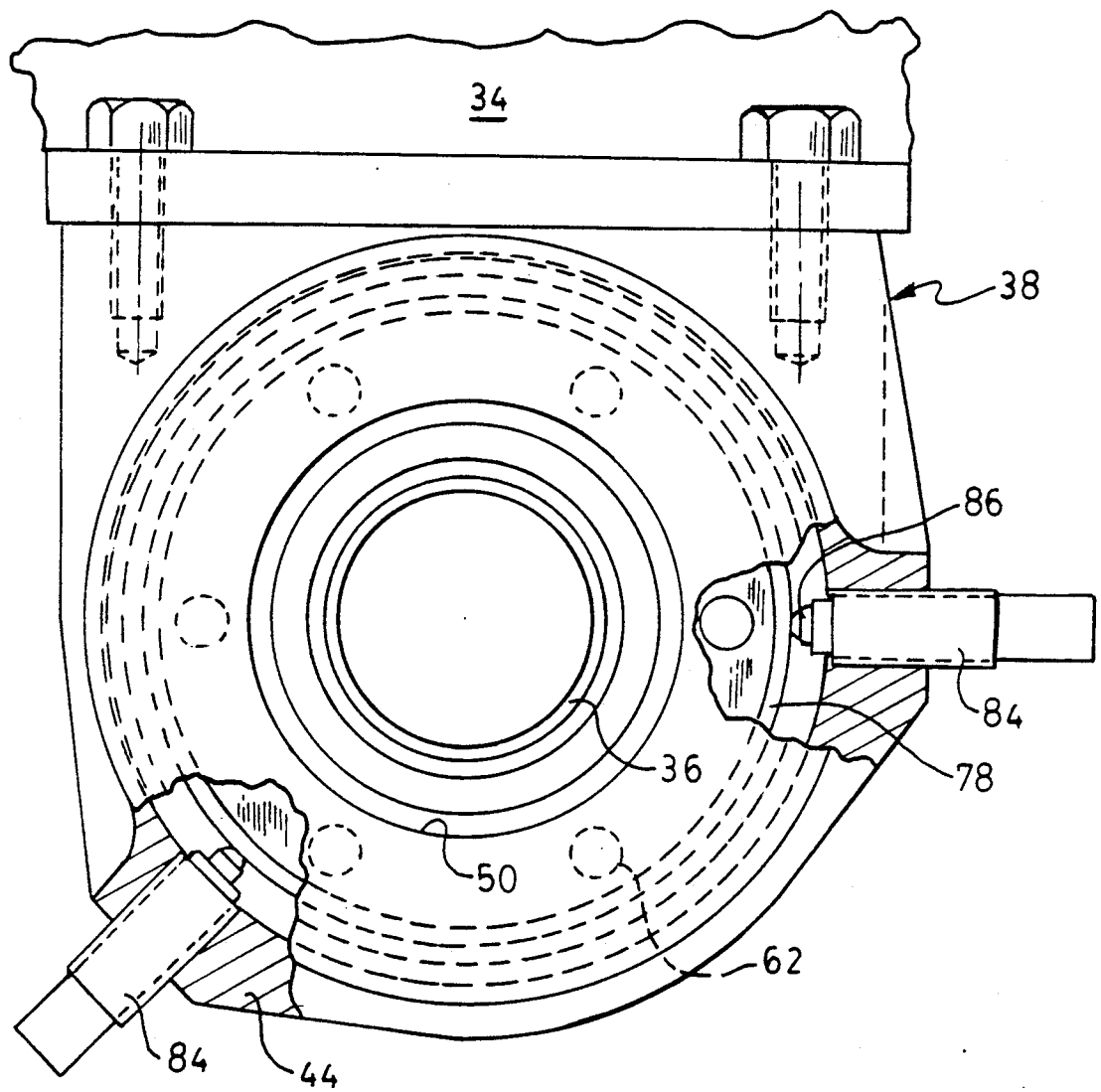
FIG. 4 is a plan view with partial section of the break away holder showing the location of the switches.

A circumferential cam ring 78 extending around an upper end 80 of the adaptor 54 has tapered surfaces 82 to form a cam-like switch engaging means. Two switches 84 have spring loaded plungers 86 that engage the tapered surface 82. As can be seen from FIG. 4, the switches 84 are located approximately 135° from each other around the Circumferential ring 78.

A bellows 88 extending between the first end 40 of the housing 38 and the torch tube 36 near the point where the torch 22 attaches provides a seal to the lower end of the housing 38.

INDUSTRIAL APPLICABILITY

Figure 5:
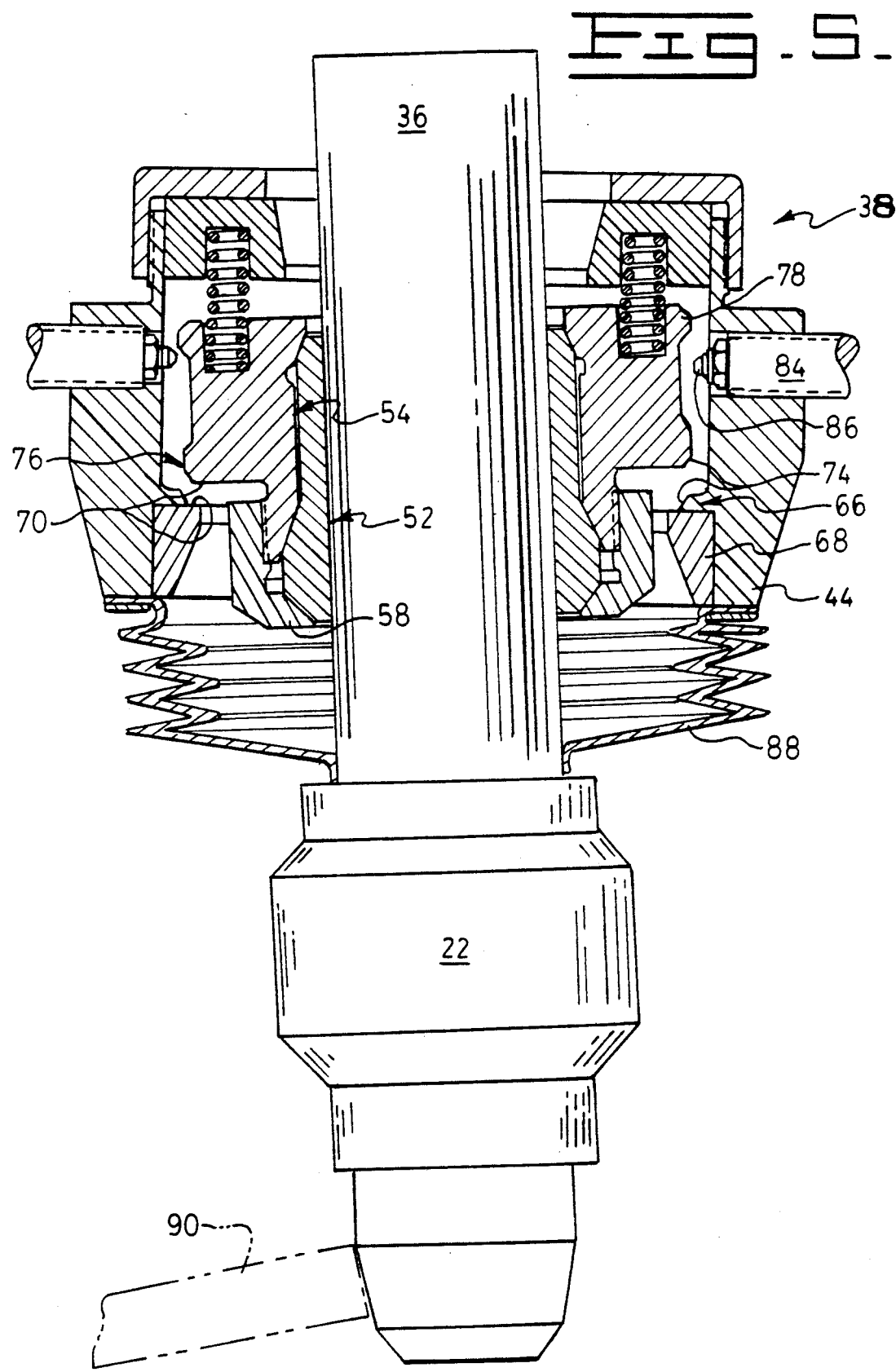
FIG. 5 is a cross sectional view of the torch holder in the break away condition.

As described in the Background, when the cutting machine is in motion and cutting the prescribed shapes of the parts in the steel plate as controlled by the controller 24 and the torch strikes an upturned piece of the plate, the above apparatus will allow the torch to break away in a manner to prevent damage to the components of the cutting machine. In FIG. 5, the break away holder 32 is shown in the condition where the torch has struck an upturned piece 90 of the steel plate shown in broken lines.

The adaptor 54 and the components attached to the torch tube 36 have moved away from the pilot seat 66 in the housing 38 allowing the cam ring 78 at the upper end 80 of the adaptor 54 to move away from either one or both switches 84 in this case, causing the controller 24 to shut the machine down. The break away of the torch holder allows the machine to come to a halt before the components of the cutting machine can be damaged.

When the operator finds the machine shut down, he merely removes the obstruction and the torch holder will reseat itself by means of the tapered and flat pilot surfaces of the pilot 76 and pilot seat 66 under force of the resilient means 62.

The combination of the flat seat 70 and the tapered surface 74 on both the pilot seat 66 of the housing 38 and the matching pilot 76 of the adaptor 54 causes the entire holding apparatus to force the torch tube 36 and the torch back to its prescribed centerline position so that it is properly aligned with the carriage to carry out the prescribed cut under the control of the controller 24.

Other aspects, objects, and advantages become apparent from a study of the specification drawings and appended claims.

What is claimed is:

1. A break away torch holder for a machine having a transverse track on which one or more torch carrying carriages are mounted so as to be transversely moveable on the transverse track by a first power means, said transverse track mounted on rails above a work piece supporting table and a second power means to move the transverse track along the rails above the work piece, a controller to cause the first and second power means to cause a torch to follow a prescribed pattern over the work piece, said break away torch holder comprising:
a housing attached to the carriage by a support, said housing having an internal pilot seat adjacent to a first opening at a first end of the housing;
a torch tube supporting the torch and having a longitudinal centerline;
a collet clamping the torch tube, said tube extending through the first opening and a second opening of said housing;
an adaptor secured to the collet, said adaptor having a pilot engaging the pilot seat;
resilient means extending between a support of the housing and an end of the adaptor, said resilient means urging the pilot of the adaptor against the pilot seat and allowing the pilot to move away from the pilot seat when the torch strikes an immovable object; and
the pilot seat in the housing and the pilot on the adaptor having matching flat surfaces perpendicular to the centerline of the torch tube, said flat surfaces when engaged being operative to center the torch in the holder.

2. The break away torch holder, as set forth in claim 1, wherein the pilot seat in the housing and the pilot on the adaptor have matching tapered surfaces extending at an angle from the flat surfaces.

3. The break away torch holder, as set forth in claim 1, wherein a sealing means extends between the torch tube and the housing to seal the first opening of the housing.

4. The break away torch holder, as set forth in claim 3, wherein the sealing means is a bellows.

5. The break away torch holder, as set forth in claim 1, wherein a switch extends through a wall of the housing, said switch engaging a cam on the adaptor whereby when the cam moves away from the switch, the switch is activated.

6. The break away torch holder, as set forth in claim 5, wherein there are at least two switches extending through the wall of the housing in contact with the cam of the adaptor.

7. The break away torch holder, as set forth in claim 6, wherein the switches are 135° apart.

8. A break away torch holder for a flame cutting machine, said machine having a transverse track on which one or more carriages having supports carrying torches are mounted so as to be transversely moveable and said transverse track is longitudinally moveable on guide rails disposed on both ends of the transverse track and a support table for holding work pieces to be processed and being located under the transverse track and between the guide rails, said break away torch holder comprising;
a housing attached to the carriage by a support, said housing having an internal pilot seat adjacent to a first opening at a first end of the housing and surrounding a torch tube supporting the torch, said torch tube extending through the first opening and a second opening at an opposite end of the housing;
a collet clamped to and supporting the torch tube and an adaptor secured to said collet, said adaptor having a pilot engaging the pilot seat, the pilot seat and pilot having matching flat surfaces perpendicular to a centerline of the torch tube and matching tapered surfaces extending at an angle from the matching flat surfaces;
resilient means extending between a support fixed at the opposite end of the housing and the adaptor urging the pilot against the pilot seat and the flat surfaces into contact with each other and allowing the pilot to move away from the pilot seat when the torch strikes an immovable object; and
so constructed and arranged that when the torch strikes an upturned work piece it will break away from the pilot seat preventing damage to the torch and when the upturned work piece is removed the torch pilot will be urged into the pilot seat, returning the torch to its proper position to continue cutting along its prescribed path.

9. The break away torch holder, as set forth in claim 8, including a bellows extending between the torch tube and the housing to seal the first opening of the housing.

10. The break away torch holder, as set forth in claim 8, wherein a switch extends through a wall of the housing, said switch engaging a cam on the adaptor whereby when the cam moves away from the switch the switch is activated.

11. The break away torch holder, as set forth in claim 11, wherein there are at least two switches extending through the wall of the housing in contact with the cam of the adaptor, said switches being in the range of 135° apart around the circumference of the cam ring 78.

12. A torch holder for a flame cutting machine, comprising:
a housing attached to the carriage by a support, said housing having an internal pilot seat adjacent a first opening at a first end of the housing;
a torch and a torch tube supporting the torch and extending through the first opening and a second opening of said housing;
a collet for clamping the torch tube in position;
an adaptor secured to the collet and having means for compressing the collet against the torch tube, the adaptor having a pilot engaging the pilot seat;
resilient means extending between the support of the housing and an end of the adaptor, said resilient means urging the pilot of the adaptor against the pilot seat;
a switch extending though a wall of the housing, said switch engaging a cam on the adaptor; and
flexible sealing means attached to and extending between the first end of the housing and the torch tube for preventing debris and fumes from the cutting action from entering the first opening and fouling the pilot seat.

* * * * *